(12) United States Patent
Lo et al.

(10) Patent No.: US 9,883,170 B2
(45) Date of Patent: *Jan. 30, 2018

(54) METHOD FOR ESTIMATING DISTANCE, AND SYSTEM AND COMPUTER-READABLE MEDIUM FOR IMPLEMENTING THE METHOD

(71) Applicant: LITE-ON TECHNOLOGY CORP., Taipei (TW)

(72) Inventors: Yi-Chung Lo, Taipei (TW); Zong-Sian Li, Taipei (TW)

(73) Assignee: Lite-On Technology Corp., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/642,506

(22) Filed: Jul. 6, 2017

(65) Prior Publication Data

US 2017/0310950 A1 Oct. 26, 2017

Related U.S. Application Data

(63) Continuation of application No. 14/852,963, filed on Sep. 14, 2015, now Pat. No. 9,729,861.

(30) Foreign Application Priority Data

Dec. 24, 2014 (CN) .......................... 2014 1 0813662

(51) Int. Cl.
*G06K 9/00* (2006.01)
*H04N 13/02* (2006.01)
*G06T 7/62* (2017.01)

(52) U.S. Cl.
CPC ........... *H04N 13/0271* (2013.01); *G06T 7/62* (2017.01); *G06T 2207/10028* (2013.01); *G06T 2207/20101* (2013.01)

(58) Field of Classification Search
USPC ........ 382/100, 103, 106–107, 140, 154–155, 382/162, 168, 173, 181, 189, 201, 209, 382/232, 254, 274, 286–291, 294, 305, 382/312; 705/14.73; 345/427; 348/47, 348/140
See application file for complete search history.

(56) References Cited

U.S. PATENT DOCUMENTS 8,660,303 B2 * 2/2014 Izadi ................... G06K 9/00369
382/103
2013/0057655 A1 * 3/2013 Su ............................ G02B 7/30
348/47

(Continued)

*Primary Examiner* — Seyed Azarian
(74) *Attorney, Agent, or Firm* — Rosenberg, Klein & Lee

(57) ABSTRACT

A method for estimating a distance between a first target and a second target in an image is to be implemented using a distance estimation system that includes a processor module. In the method, the processor module is programmed to: generate an image depth map associated with the image; generate first position information associated with a first position which corresponds to the first target in the image, and second position information associated with a second position which corresponds to the second target in the image; and compute an estimate of a distance between the first target and the second target based on at least the image depth map, the first position information, and the second position information.

12 Claims, 7 Drawing Sheets

(56) References Cited

U.S. PATENT DOCUMENTS

| | | | |
|---|---|---|---|
| 2013/0073400 A1* | 3/2013 | Heath | G06Q 30/02 705/14.73 |
| 2014/0063018 A1* | 3/2014 | Takeshita | G06T 15/08 345/427 |
| 2014/0210950 A1* | 7/2014 | Atanassov | G01B 11/02 348/47 |

* cited by examiner

US 9,883,170 B2

METHOD FOR ESTIMATING DISTANCE, AND SYSTEM AND COMPUTER-READABLE MEDIUM FOR IMPLEMENTING THE METHOD

CROSS-REFERENCE TO RELATED APPLICATION

This application is a Continued Application of U.S. patent application Ser. No. 14/852,963, filed 14 Sep. 2015, currently pending, and which claims priority of Chinese Patent Application No. 201410813662.0, filed on Dec. 24, 2014.

FIELD

The disclosure relates to a method, a system and a computer-readable medium for estimating distance, more particularly to a method, a system and a computer-readable medium for estimating a distance between a first target and a second target in an image based on an image depth map of the image.

BACKGROUND

As fabrication processes of semiconductors improve, mobile devices such as mobile phones and tablets are incorporated with more functionalities (e.g., having a camera for capturing an image and/or a video), are manufactured with lower cost, and are therefore becoming widely used. However, conventional mobile devices are unable to directly obtain a size of an object (or a distance between two targets) in the image captured thereby. Currently, one way of obtaining the size of the object is to place a reference object (e.g., a coin, a ruler, etc.) near the object in order to obtain an estimate of the size, which is inconvenient and inaccurate.

SUMMARY

Therefore, an object of the disclosure is to provide a method that can provide a more convenient way of obtaining an estimate of a size of an object and/or a distance between two targets in an image.

According to the disclosure, the method for estimating a distance between a first target and a second target in an image is to be implemented using a distance estimation system. The distance estimation system includes a processor module. The method includes the steps of:

generating, by the processor module, an image depth map associated with the image;

generating, by the processor module, first position information associated with a first position which corresponds to the first target in the image, and second position information associated with a second position, which corresponds to the second target in the image; and computing, by the processor module, an estimate of a distance between the first target and the second target based on at least the image depth map, the first position information and the second position information.

Another object of the disclosure is to provide a distance estimation system that is programmed to implement the aforementioned method.

According to the disclosure, the distance estimation system is for estimating a distance between a first target and a second target in an image. The distance estimation system includes a processor module that is programmed to:

generate an image depth map associated with the image;

generate first position information associated with a first position which corresponds to the first target, and second position information associated with a second position which corresponds to the second target; and compute an estimate of a distance between the first target and the second target based on at least the image depth map, the first position information and the second position information.

Yet another object of the disclosure is to provide a non-transitory computer-readable medium. According to the disclosure, the non-transitory computer-readable medium stores a software application therein. The software application includes instructions that, when executed by a processor module of a distance estimation system, causes the processor module to perform a method for estimating a distance between a first target and a second target in an image. The method includes the steps of:

generating an image depth map associated with the image;

generating first position information associated with a first position which corresponds to the first target, and second position information associated with a second position which corresponds to the second target; and computing an estimate of a distance between the first target and the second target based on at least the image depth map, the first position information and the second position information.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
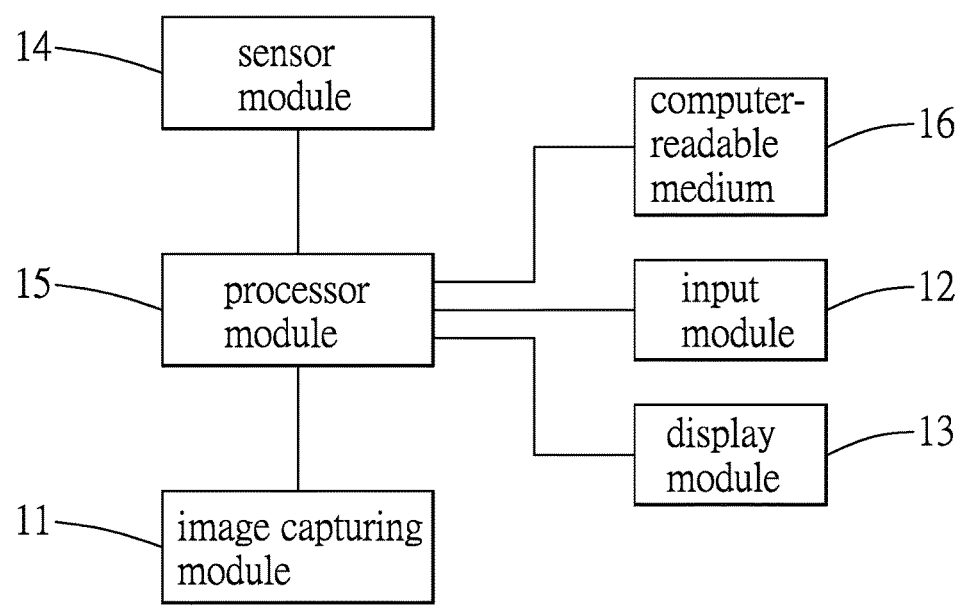
FIG. 1 is a block diagram of a distance estimation system for estimating a distance, according to a first embodiment of the disclosure.

Before the disclosure is described in greater detail, it should be noted that like elements are denoted by the same reference numerals throughout the disclosure.

FIG. 1 is a block diagram of a distance estimation system for estimating a distance, according to the first embodiment of the disclosure. The distance estimation system includes an image capturing module 11, an input module 12, a display module 13, a sensor module 14, a processor module 15, and a computer-readable medium 16.

The image capturing module 11 has stereopsis functionality. That is, an image captured by the image capturing module 11 includes information regarding a depth of each object captured in the image. As a result, the image captured by the image capturing module 11 may allow a person to identify relative depths of objects contained in the image. The image capturing module 11 may include a lens and an image sensor, and is capable of image capturing.

It is noted that, in various embodiments, one or more additional lenses and image sensors may be included in the image capturing module 11. For example, in one embodiment, a plurality of image sensors are included, and each time when the image capturing module 11 is used for image capturing, a plurality of images are obtained, each corresponding with a respective one of the image sensors. In another embodiment, a plurality of lenses are included, and each time when the image capturing module 11 is used for image capturing, a plurality of images are obtained, each corresponding with a respective one of the lenses.

The input module 12 may be embodied in a touchscreen, a set of buttons, or a combination thereof, to serve as a user interface for receiving user input. The display module 13 is configured to display the image. The sensor module 14 is configured to detect a tilt angle of the image sensor with respect to an imaginary vertical line. For example, the imaginary vertical line is perpendicular to a horizontal plane such as a ground. The processor module 15 is coupled to the image capturing module 11, the input module 12, the display module 13, the sensor module 14, and the computer-readable medium 16.

The computer-readable medium 16 stores a software application therein. The software application includes instructions that, when executed by the processor module 15, causes the processor module 15 to perform a method for estimating a distance. In practice, the software application may be stored in the computer-readable medium 16 or downloaded via a network.

In this embodiment, the distance estimation system may be embodied in a mobile device such as a smart phone, a digital camera, a tablet computer, etc. Accordingly, the image capturing module 11 is a camera module, the input module 12 is a touchscreen interface, the display module 13 is a display screen, the sensor module 14 is a gyroscope or other components capable of detecting a tilt angle of the mobile device (i.e., with respect to a pitch axis, a roll axis or a yaw axis), and the computer-readable medium 16 is a storage medium of the mobile device.

It is noted that in other embodiments, the tilt angle of the mobile device may be calculated using, for example, trigonometric functions, and the sensor module 14 may be omitted.

In other embodiments, the distance estimation system may be embodied in a combination of a computer and a device capable of capturing an image, such as a mobile device, an event data recorder (EDR), a monitoring device, a rear view camera, etc. In this case, the input module 12 is a mouse and/or keyboard of the computer, the display module 13 is a screen of the computer, the sensor module 14 is a gyroscope or other components capable of detecting a tilt angle of the device capable of capturing an image, the processor module 15 is a processor of the computer such as a CPU, and the computer-readable medium 16 is a storage medium of the computer such as a random access memory (RAM), an electrically-erasable programmable read-only memory (EEPROM), a compact disc read-only memory (CD-ROM), a hard disk, etc.

It is noted that in other embodiments, the tilt angle of the device capable of capturing an image may be calculated using, for example, trigonometric functions, and the sensor module 14 may be omitted.

Figure 2:
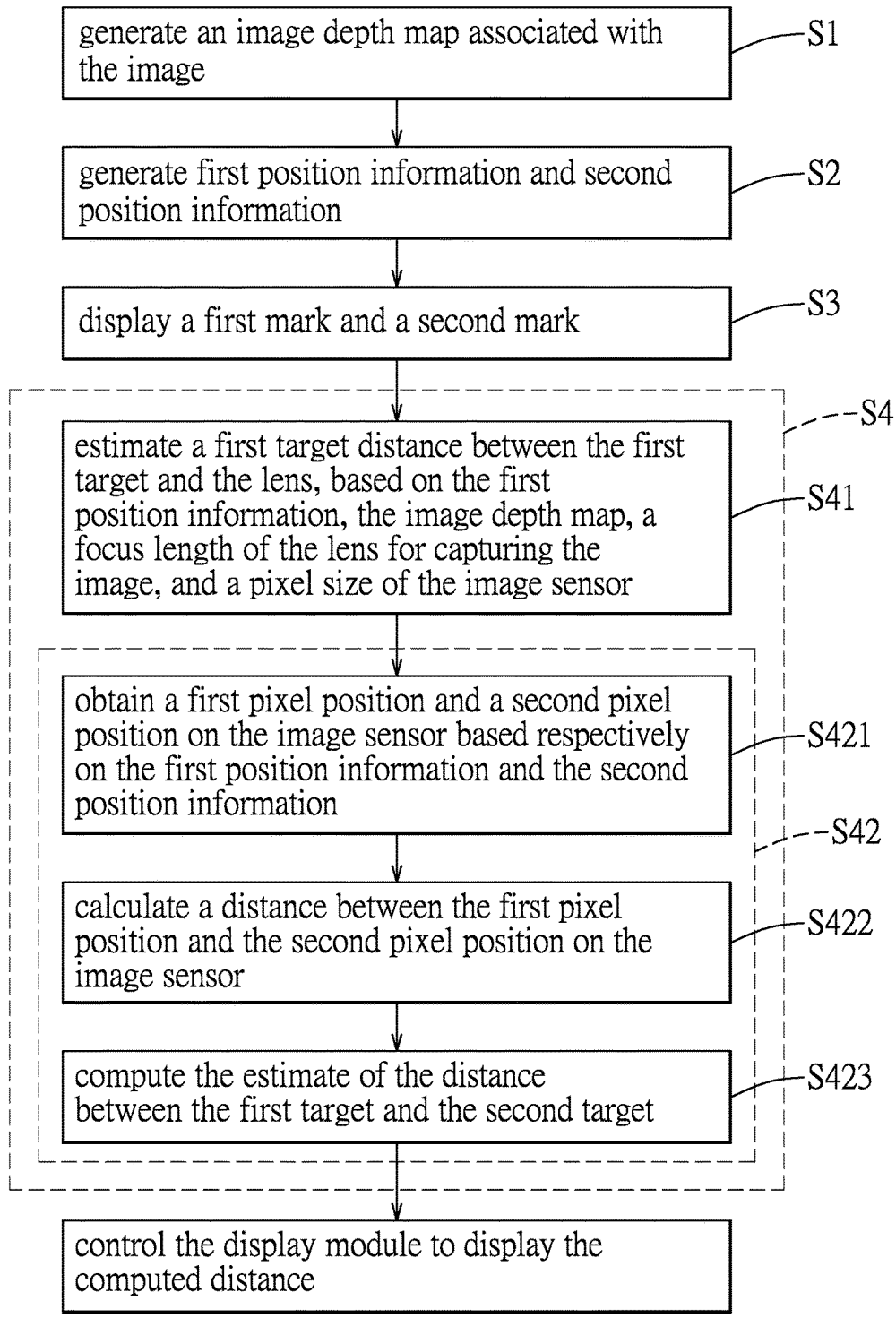
FIG. 2 is a flow chart depicting steps of the method for estimating a distance that is to be implemented by the distance estimation system as depicted in FIG. 1.

FIG. 2 is a flow chart depicting, according to the first embodiment of the disclosure, steps of the method for estimating a distance that is to be implemented by the distance estimation system as depicted in FIG. 1.

Figure 3:
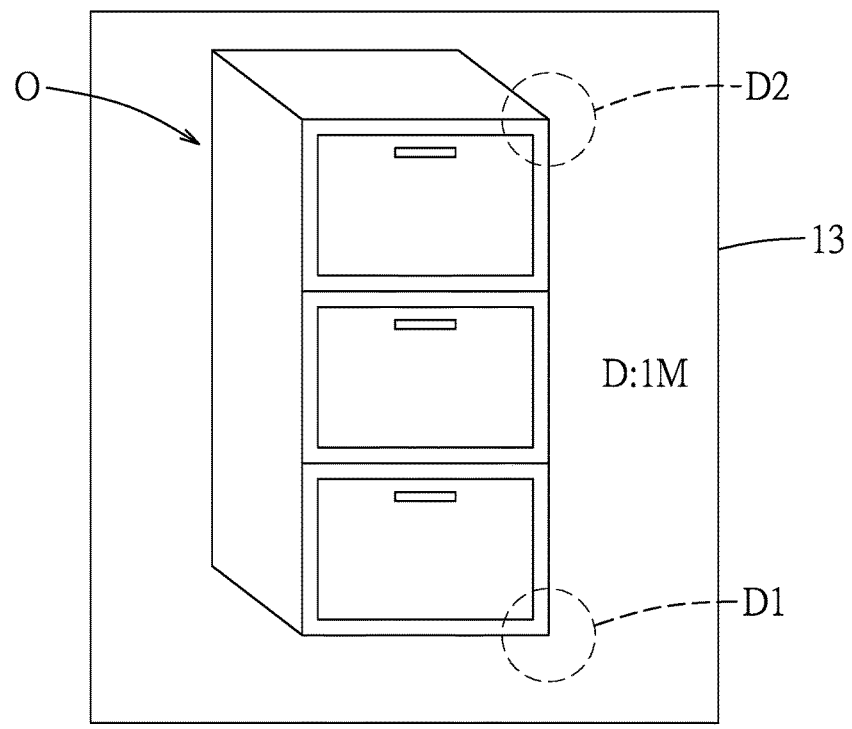
FIG. 3 illustrates an image displayed by a display module of the distance estimation system.

The method as illustrated in FIG. 2 is used to compute an estimate of an actual distance between a first target and a second target in an image captured by the image capturing module 11. For example, the input module 12 and the display module 13 are integrated as a touchscreen, and the first and second targets are selected by a user using the touchscreen. This may be done by the user touching two positions (i.e. first and second positions being selected) on the image displayed by the display module 13, and the first and second positions on the image serve as the first and second targets (as shown in FIG. 3), respectively.

In step S1, for the image captured by the image capturing module 11, the processor module 15 generates an image depth map associated with the image. The image depth map contains information regarding a distance between a surface of each of the targets captured in the image and a viewpoint, which generally indicates the position of the lens.

It is noted that in other embodiments, operations for generating the image depth map may employ one or more images captured by the image capturing module 11 for improved accuracy.

In step S2 the processor module 15 generates first position information associated with a first position which corresponds to the first target, and second position information associated with a second position which corresponds to the second target. In particular, the first position information includes a set of coordinates of the first position on the image where the first target is located. Similarly, the second position information includes a set of coordinates of the second position on the image where the second target is located.

In step S3, the processor module 15 controls the display module 13 to display a first mark at the first position, and to display a second mark at the second position. Referring to FIG. 3, the display module 13 displays the image having a cabinet (O). When the user touches two corners of the cabinet (O) (the two corners serve as the first and second targets, respectively), the display module 13 is controlled to display two marks ($D_1$ and $D_2$) indicating the first and second positions selected by the user.

In step S4, the processor module 15 computes the estimate of the distance between the first target and the second target based on at least the image depth map, the first position information, and the second position information. Specifically, step S4 includes the following sub-steps S41 and S42.

In sub-step S41, the processor module 15 estimates a first target distance between the first target and the lens based on the first position information, the image depth map, a focus length of the lens for capturing the image, and a pixel size of the image sensor.

In sub-step S42, the processor module 15 computes the estimate of the distance between the first target and the second target, based on at least the first target distance, the first position information, the second position information, and the focus length of the lens. The sub-step S42 further includes the following sub-steps S421 to S423.

In sub-step S421, the processor module 15 obtains a first pixel position and a second pixel position on the image sensor, based respectively on the first position information and the second position information. The first and second pixel positions correspond to the first and second positions in the image, respectively. In sub-step S422, the processor module 15 calculates a distance between the first pixel position and the second pixel position on the image sensor. In sub-step S423, the processor module 15 computes the estimate of the distance between the first target and the second target based on the first target distance, the distance between the first pixel position and the second pixel position on the image sensor, the focus length of the lens, and the tilt angle of the mobile device.

Figure 4:
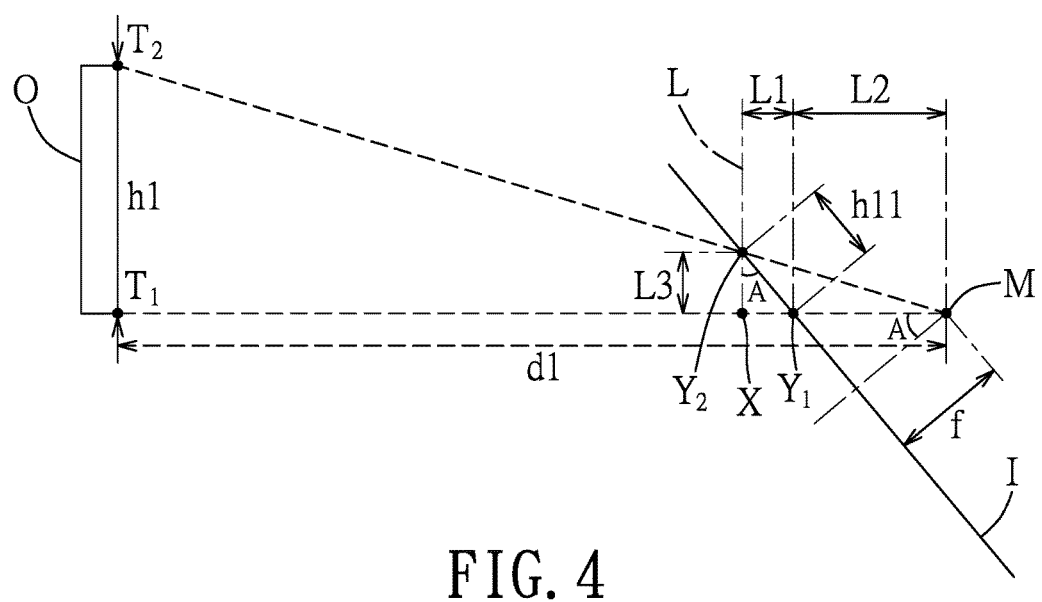
FIG. 4 illustrates operations of computing an estimate of a distance between a first target and a second target in the image according to the first embodiment.

FIG. 4 is a schematic view illustrating the image of the cabinet (O), as shown in FIG. 3, being captured by the image capturing module 11 using perspective projection and the operations of computing an estimate of the distance. The lens has a focal point (M) and a focal length (f). The cabinet (O) has a height ($h_1$), which, in this case, is the actual distance between the first target ($T_1$) and the second target ($T_2$). The image sensor (I) is tilted by a tilt angle (A) with respect to an imaginary vertical line (L). The first and second targets ($T_1$, $T_2$) (i.e., the lower and upper corners of the cabinet (O)) are projected respectively on first and second pixel positions ($Y_1$) and ($Y_2$) on the image sensor (I).

It is known that the triangle ($\Delta MT_1T_2$) and the triangle ($\Delta MXY_2$) are similar triangles (as seen in FIG. 4, the point (X) is located on the line $T_1Y_1$, and the triangle ($\Delta MXY_2$) is a right triangle). Subsequently, the following relation holds:

$$\frac{L_1 + L_2}{d1} = \frac{L_3}{h1} \quad (1)$$

In sub-step S41, the first target distance ($d_1$) is obtained. Next, in sub-step S421, the first and second pixel positions ($Y_1$, $Y_2$) are obtained. Therefore, a distance (h11) between the first and second pixel positions ($Y_1$, $Y_2$) on the image sensor (I) can be calculated in sub-step S422.

Subsequently, in sub-step S423, the estimate of the height ($h_1$) of the cabinet (O) (i.e., the actual distance between the first and second targets ($T_1$, $T_2$)) can be computed using the following equation:

$$\frac{h11 \cdot \sin(A) + f \cdot \sec(A)}{d1} = \frac{h11 \cdot \cos(A)}{h1}$$

since $L_1$=h11*sin(A), $L_2$=f*sec(A), and $L_3$=h11*cos(A). By taking the tilt angle into consideration, the estimation of the actual distance between the first and second targets (T1, T2) may have improved accuracy.

In step S5, the processor module 15 controls the display module 13 to display the estimate of the height ($h_1$) (i.e., the actual distance between the first and second targets ($T_1$, $T_2$)). For example, the symbol "D:1M" in FIG. 3 indicates the height ($h_1$) of the cabinet (O) in the image that is estimated to be one meter. It is noted that in other embodiments, the first target and the second target may be parts of different objects captured in the image.

Figure 5:
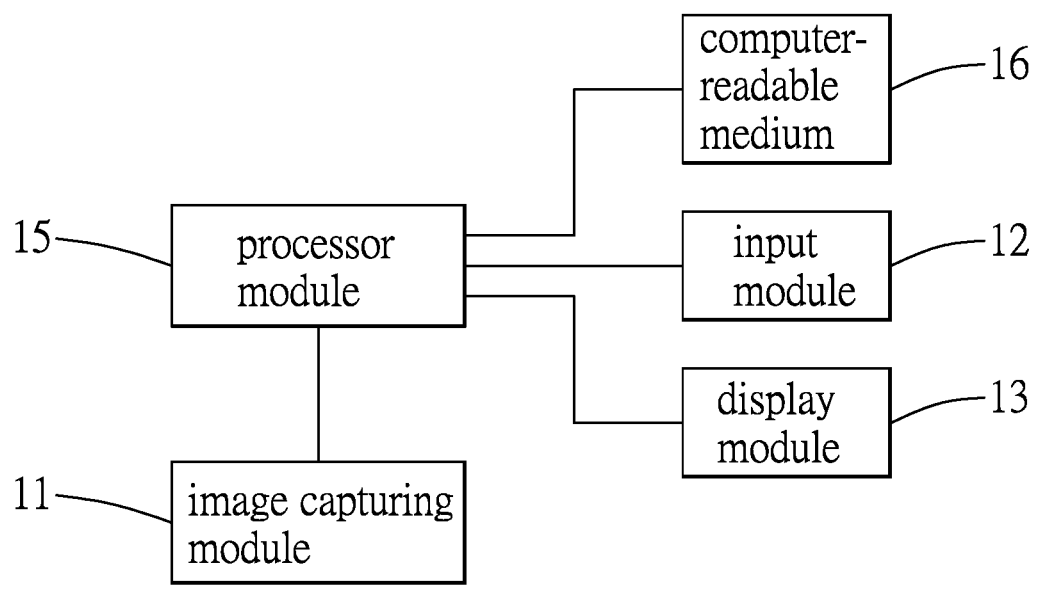
FIG. 5 is a block diagram of a distance estimation system for estimating a distance, according to a second embodiment of the disclosure.

FIG. 5 illustrates a block diagram of a distance estimation system for estimating a distance, according to the second embodiment of the disclosure. The difference between the distance estimation system in this embodiment and that in the first embodiment resides in that the distance estimation system of this embodiment omits the sensor module 14.

Figure 8:
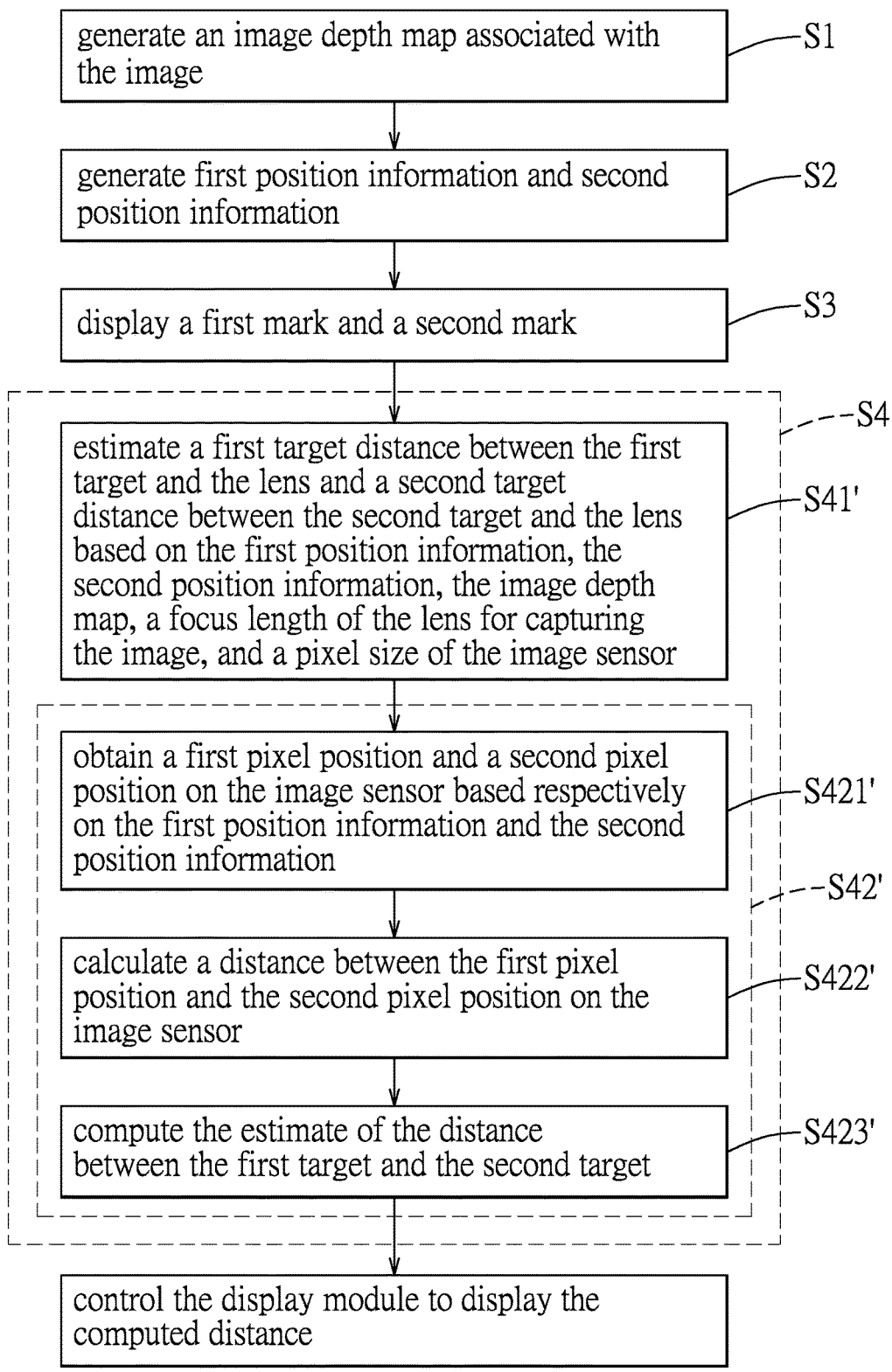
FIG. 8 is a flow chart depicting steps of the method for estimating a distance that is to be implemented by the distance estimation system as depicted in FIG. 5, according to the second embodiment.

The difference between the method in this embodiment shown in FIG. 8 and that in the first embodiment resides in the computation of the estimate of the distance between the first target and the second target (i.e., step S4). While the estimation in the first embodiment is more accurate, the estimation in this embodiment may be done with higher efficiency.

In sub-step S41', the processor module 15 estimates the first target distance between the first target and the lens, and further estimates a second target distance between the second target and the lens. The estimations are based on the first position information, the second position information, the image depth map, the focus length of the lens for capturing the image, and the pixel size of the image sensor.

In sub-step S42', the processor module 15 computes the estimate of the distance between the first target and the second target. The computing is based on at least the first target distance, the second target distance, the first position information, the second position information, and the focus length of the lens.

Figure 6:
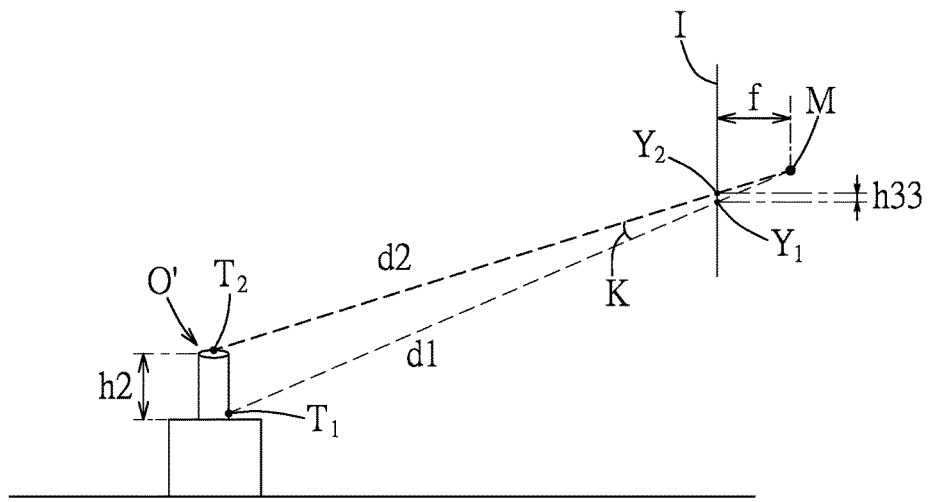
FIG. 6 illustrates operations of computing an estimate of a distance between a first target and a second target in the image according to the second embodiment.

FIG. 6 is a schematic view illustrating an object (O') being captured by the image capturing module 11 and the operations of computing the estimate of the distance. The lens has a focal point (M) and a focal length (f). The object (O') has a height ($h_2$), which, in this case, is the distance between the first target ($T_1$) and the second target ($T_2$).

In sub-step S41', the processor module 15 estimates the first target distance ($d_1$) and the second target distance ($d_2$).

Next, in sub-step S421', the processor module 15 obtains the first and second pixel positions ($Y_1$, $Y_2$). Therefore, a distance ($h_{33}$) between the first and second pixel positions ($Y_1$, $Y_2$) on the image sensor (I) can be calculated in sub-step S422'.

Afterward, in sub-step S423', an estimate of the height ($h_2$) of the object (O') can be computed using the following equations:

$$h_2 = d_1^2 + d_2^2 - 2 \cdot d_1 \cdot d_2 \cdot \cos(K)$$

$$K = \frac{h_{33}}{f}$$

It is noted that the angle (K) may be obtained using small-angle approximation. That is, the angle (K) can be approximated by the ratio ($h_{33}$/f). It is noted that the estimation is more accurate when the angle (K) is smaller. Moreover, the estimate of the height ($h_2$) is computed using the law of cosines. Therefore, the estimation is more accurate when the tilt angle of the image sensor (I) is smaller, preferably smaller than 20 degrees.

In a third embodiment, the distance estimation system as shown in FIG. 1 is further provided with the function to assist the user to calibrate the image capturing module 11 such that the tilt angle of the image sensor with respect to the imaginary vertical line is zero when the image is captured. For example, the processor module 15 may control the display module 13 to display a horizontal reference line, in order to visually notify the user. In another example, the distance estimation system may output a visual signal (e.g., a light signal) when the tilt angle of the image sensor (I) with respect to the imaginary vertical line is zero.

Figure 9:
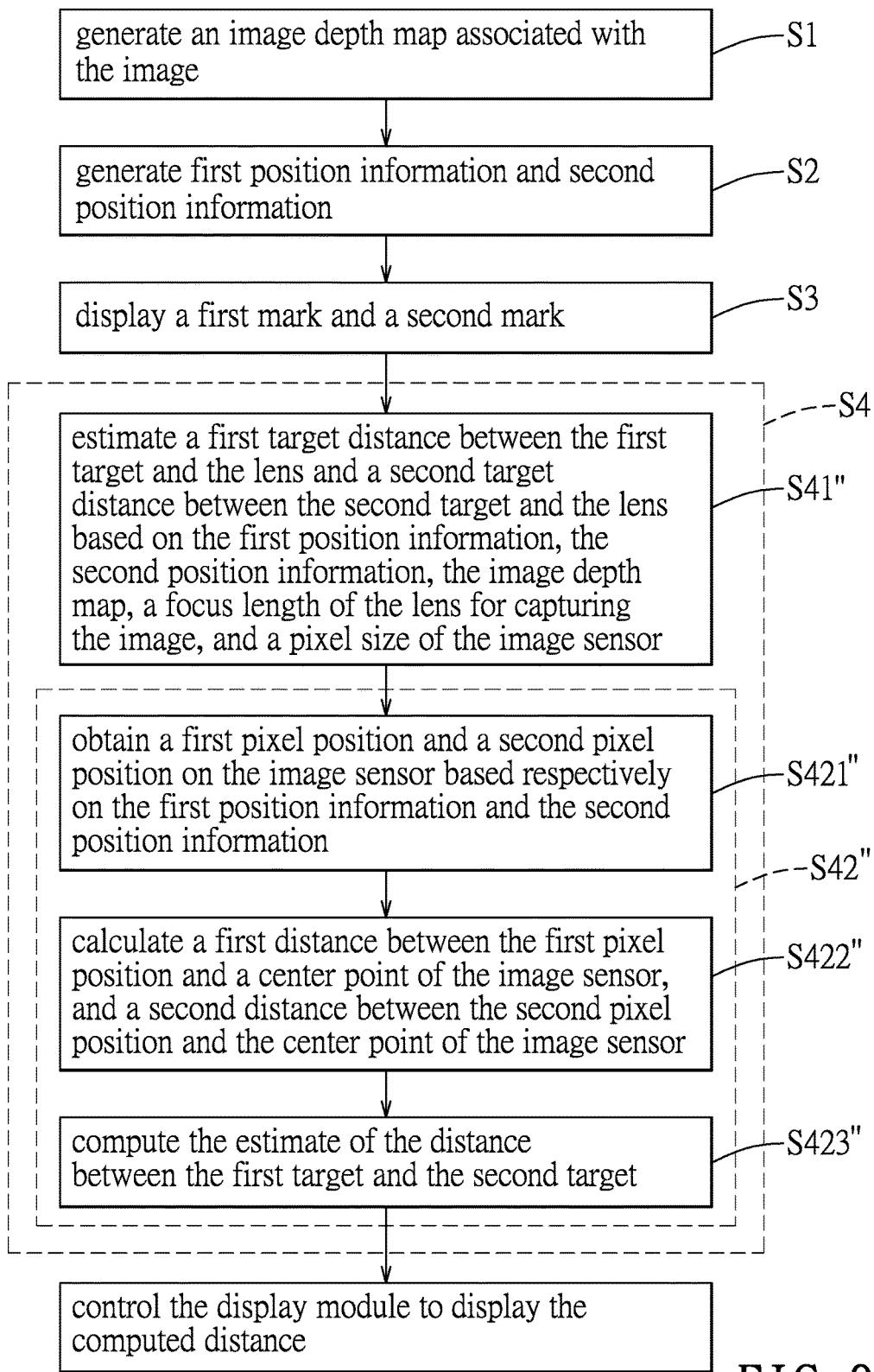
FIG. 9 is a flow chart depicting steps of the method for estimating a distance that is to be implemented by the distance estimation system as depicted in FIG. 1, according to the third embodiment.

The difference between the method in this embodiment shown in FIG. 9 and that in the first embodiments resides in the computation of the estimate of the distance between the first target and the second target (i.e., step S4).

Figure 7:
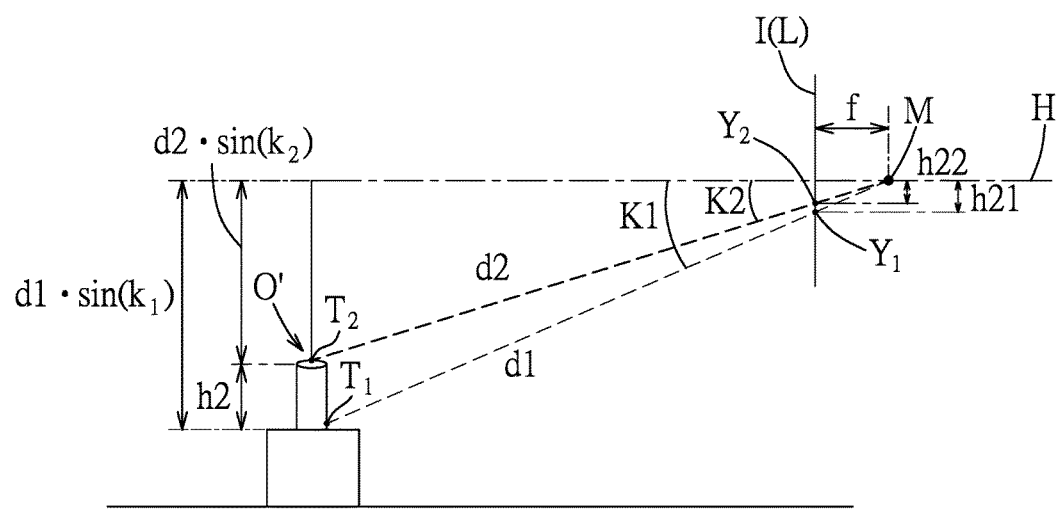
FIG. 7 illustrates operations of computing an estimate of a distance between a first target and a second target according to a third embodiment.

FIG. 7 is a schematic view illustrating an object (O') being captured by the image capturing module 11 and the operations of computing the estimate of the distance. The lens has a focal point (M) which corresponds to a center point of the image sensor (I), and a focal length (f). The object (O') has a height ($h_2$), which, in this case, is the distance between the first target ($Y_1$) and the second target ($Y_2$). The tilt angle of the image sensor (I) with respect to the imaginary vertical line (L) is zero.

In sub-step S41", the processor module 15 estimates the first target distance ($d_1$) and the second target distance ($d_2$).

Next, in sub-step S421", the processor module 15 obtains the pixel positions ($Y_1$, $Y_2$). In sub-step S422", the processor module 15 calculates a first distance ($h_{21}$) between the first pixel position ($Y_1$) and the center point of the image sensor (I), and a second distance ($h_{22}$) between the second pixel position ($Y_2$) and the center point of the image sensor (I).

Afterward, in sub-step S423", the estimate of the height ($h_2$) of the object (O') can be computed using the following equations:

$$h_2 = d_1 \cdot \sin(K_1) - d_2 \cdot \sin(K_2)$$

$$K_1 = \tan^{-1} \frac{h_{21}}{f}$$

$$K_2 = \tan^{-1} \frac{h_{22}}{f}$$

To sum up, the distance estimation system, method and computer-readable medium according to the embodiments of the disclosure provides a relatively more convenient, reliable, and efficient way to obtain an estimate of a distance between two targets in the image, using the image depth map, the first position information, the second position information, and parameters regarding the image capturing module 11 (e.g., the focal length, size of pixels, etc.). The method as described in the disclosure may be applied in calculating a size of one object (by selecting two extreme points of the one object as the targets) or in calculating a distance between two different objects. As a result, the image captured by the distance estimation system as described in the disclosure contains three-dimensional information.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for estimating a distance between a first target and a second target in an image, the method to be implemented using a distance estimation system that includes a processor, an image capturing subsystem for capturing the image, where the image capturing subsystem includes a lens, an image sensor and a tilt angle sensor subsystem for detecting a tilt angle of the image sensor with respect to an imaginary vertical line, the method comprising:

a) generating, by the processor, an image depth map associated with the image;

b) generating, by the processor, first position information associated with a first position which corresponds to the first target in the image, and second position information associated with a second position which corresponds to the second target in the image; and c) computing, by the processor, an estimate of a distance between the first target and the second target based on at least the image depth map, the first position information and the second position information, wherein computing the estimate of a distance between the first target and the second target further includes:

c-1) estimating, by the processor, a first target distance between the first target and the lens based on at least the first position information, the image depth map, a focus length of the lens for capturing the image, and a pixel size of the image sensor;

c-2) computing, by the processor, the estimate of the distance between the first target and the second target, based on at least the first target distance, the first position information, the second position information, and the focus length of the lens;

c-3 obtaining a first pixel position and a second pixel position on the image sensor based respectively on the first position information and the second position information, the first and second pixel positions corresponding to the first and second positions in the image, respectively;

c-4 calculating a distance between the first pixel position and the second pixel position on the image sensor; and c-5 computing the estimate of the distance ($h_1$) between the first target and the second target using the following equation:

$$\frac{h_{11} \cdot \sin(A) + f \cdot \sec(A)}{d_1} = \frac{h_{11} \cdot \cos(A)}{h_1}$$

where ($h_{11}$) represents the distance between the first and second pixel positions on the image sensor, (A) represents the tilt angle, (f) represents the focus length of the lens, and ($d_1$) represents the first target distance.

2. The method of claim 1, the distance estimation system further including a display, wherein the method further comprises the step of controlling, by the processor, the display to display the estimate of the distance on the image.

3. A distance estimation system for estimating a distance between a first target and a second target in an image, the system comprising a processor that is programmed to:

generate an image depth map associated with the image;

generate first position information associated with a first position which corresponds to the first target, and second position information associated with a second position which corresponds to the second target; and compute an estimate of a distance between the first target and the second target based on at least the image depth map, the first position information and the second position information;

the distance estimation system further comprising an image capturing subsystem and a tilt angle sensor subsystem for detecting a tilt angle of the image sensor with respect to an imaginary vertical line, the image capturing subsystem being configured for capturing the image and includes a lens and an image sensor, wherein the processor is further programmed to:

estimate a first target distance between the first target and the lens based on at least the first position information, the image depth map, a focus length of the lens for capturing the image, and a pixel size of the image sensor;

compute the estimate of the distance between the first target and the second target, based on at least the first target distance, the first position information, the second position information, and the focus length of the lens;

obtain a first pixel position and a second pixel position on the image sensor based respectively on the first position information and the second position information, the first and second pixel positions corresponding to the first and second positions in the image, respectively;

calculate a distance between the first pixel position and the second pixel position on the image sensor; and compute the estimate of the distance ($h_1$) between the first target and the second target using the following equation:

$$\frac{h_{11} \cdot \sin(A) + f \cdot \sec(A)}{d_1} = \frac{h_{11} \cdot \cos(A)}{h_1}$$

where ($h_{11}$) represents the distance between the first and second pixel positions on the image sensor, (A) represents the tilt angle, (f) represents the focus length of the lens, and ($d_1$) represents the first target distance.

4. The distance estimation system of claim 3, further comprising:
a display for displaying the image thereon; and
an input interface that receives user-input of the first target and the second target in the image;
wherein the processor is further programmed to control said display to display the estimate of the distance on the image.

5. A non-transitory computer-readable medium that stores a software application therein, the software application including instructions that, when executed by a processor of a distance estimation system, causes the processor to perform a method for estimating a distance between a first target and a second target in an image, the distance estimation system further including an image capturing subsystem for capturing the image and a tilt angle sensor subsystem for detecting a tilt angle of the image sensor with respect to an imaginary vertical line, the image capturing subsystem including a lens and an image sensor, the method including:
a) generating an image depth map associated with the image;
b) generating first position information associated with a first position which corresponds to the first target, and second position information associated with a second position which corresponds to the second target; and
c) computing an estimate of a distance between the first target and the second target based on at least the image depth map, the first position information and the second position information;
wherein computing the estimate of a distance between the first target and the second target further includes:
c-1) estimating a first target distance between the first target and the lens based on at least the first position information, the image depth map, a focus length of the lens for capturing the image, and a pixel size of the image sensor; and
c-2) computing the estimate of the distance between the first target and the second target, based on at least the first target distance, the first position information, the second position information, and the focus length of the lens,
wherein the software application further includes instructions that, when executed by the processor, causes the processor to further:
obtain a first pixel position and a second pixel position on the image sensor based respectively on the first position information and the second position information, the first and second pixel positions corresponding to the first and second positions in the image, respectively;
calculate a distance between the first pixel position and the second pixel position on the image sensor; and
compute the estimate of the distance ($h_1$) between the first target and the second target using the following equation:

$$\frac{h_{11} \cdot \sin(A) + f \cdot \sec(A)}{d_1} = \frac{h_{11} \cdot \cos(A)}{h_1}$$

where ($h_{11}$) represents the distance between the first and second pixel positions on the image sensor, (A) represents the tilt angle, (f) represents the focus length of the lens, and ($d_1$) represents the first target distance.

6. The non-transitory computer-readable medium of claim 5, the distance estimation system further including a display, wherein the software application further includes instructions that, when executed by the processor, causes the processor to control the display module to display the estimate of the distance on the image.

7. A method for estimating a distance between a first target and a second target in an image, the method to be implemented using a distance estimation system that includes a processor, an image capturing subsystem for capturing the image, where the image capturing subsystem includes a lens, an image sensor and a tilt angle sensor subsystem for detecting a tilt angle of the image sensor with respect to an imaginary vertical line, the image being captured when the tilt angle of the tilt angle sensor subsystem is equal to zero degrees, the method comprising:
a) generating, by the processor, an image depth map associated with the image;
b) generating, by the processor, first position information associated with a first position which corresponds to the first target in the image, and second position information associated with a second position which corresponds to the second target in the image; and
c) computing, by the processor, an estimate of a distance between the first target and the second target based on at least the image depth map, the first position information and the second position information,
wherein computing the estimate of a distance between the first target and the second target further includes:
c-1) estimating, by the processor, a first target distance between the first target and the lens based on at least the first position information, the image depth map, a focus length of the lens for capturing the image, and a pixel size of the image sensor;
c-2) computing, by the processor, the estimate of the distance between the first target and the second target, based on at least the first target distance, the first position information, the second position information, and the focus length of the lens;
wherein the step of estimating a first target distance between the first target and the lens further estimates a second target distance between the second target and the lens and additionally utilizes the second position information; and the step of computing the estimate of the distance between the first target and the second target additionally utilizes the second target distance;
wherein, the step of computing the estimate of the distance between the first target and the second target further includes:
obtaining a first pixel position and a second pixel position on the image sensor based respectively on the first position information and the second position information, the first and second pixel positions corresponding to the first and second positions in the image, respectively;
calculating a first distance between the first pixel position and a center point of the image sensor, and a second distance between the second pixel position and the center point of the image sensor; and
computing the estimate of the distance ($h_2$) between the first target and the second target using the following equations:

$$h_2 = d_1 \cdot \sin(K_1) - d_2 \cdot \sin(K_2)$$

$$K_1 = \tan^{-1} \frac{h_{21}}{f}$$

$$K_2 = \tan^{-1} \frac{h_{22}}{f}$$

where ($d_1$) represents the first target distance, ($d_2$) represents the second target distance, ($h_{21}$) represents the first distance, ($h_{22}$) represents the second distance, and (f) represents the focus length of the lens.

8. The method of claim 7, the distance estimation system further including a display, wherein the method further comprises the step of controlling, by the processor, the display to display the estimate of the distance on the image.

9. A distance estimation system for estimating a distance between a first target and a second target in an image, the system comprising a processor that is programmed to:
generate an image depth map associated with the image;
generate first position information associated with a first position which corresponds to the first target, and second position information associated with a second position which corresponds to the second target; and
compute an estimate of a distance between the first target and the second target based on at least the image depth map, the first position information and the second position information;
the distance estimation system further comprising an image capturing subsystem, the image capturing subsystem being configured for capturing the image and including a lens, an image sensor and a tilt angle sensor subsystem for detecting a tilt angle of the image sensor with respect to an imaginary vertical line, wherein the processor is further programmed to:
estimate a first target distance between the first target and the lens based on at least the first position information, the image depth map, a focus length of the lens for capturing the image, and a pixel size of the image sensor;
compute the estimate of the distance between the first target and the second target, based on at least the first target distance, the first position information, the second position information, and the focus length of the lens;
wherein the processor further estimates a second target distance between the second target and the lens and additionally utilizes the second position information, and the processor additionally computes the estimate of the distance between the first target and the second target additionally utilizing the second target distance;
wherein responsive to the image being captured by the image capturing subsystem when the tilt angle of the image sensor is equal to zero degrees, said processor is further programmed to:
obtain a first pixel position and a second pixel position on the image sensor based respectively on the first position information and the second position information, the first and second pixel positions corresponding to the first and second positions in the image, respectively;
calculate a first distance between the first pixel position and a center point of the image sensor, and a second distance between the second pixel position and the center point of the image sensor; and
compute the estimate of the distance ($h_2$) between the first target and the second target using the following equations:

$$h_2 = d_1 \cdot \sin(K_1) - d_2 \cdot \sin(K_2)$$

$$K_1 = \tan^{-1} \frac{h_{21}}{f}$$

$$K_2 = \tan^{-1} \frac{h_{22}}{f}$$

where ($d_1$) represents the first target distance, ($d_2$) represents the second target distance, ($h_{21}$) represents the first distance, ($h_{22}$) represents the second distance, and (f) represents the focus length of the lens.

10. The distance estimation system of claim 9, further comprising:
a display for displaying the image thereon; and
an input interface that receives user-input of the first target and the second target in the image;
wherein the processor is further programmed to control said display to display the estimate of the distance on the image.

11. A non-transitory computer-readable medium that stores a software application therein, the software application including instructions that, when executed by a processor of a distance estimation system, causes the processor to perform a method for estimating a distance between a first target and a second target in an image, the distance estimation system further including an image capturing subsystem for capturing the image, where the image capturing subsystem includes a lens, an image sensor and a tilt angle sensor subsystem for detecting a tilt angle of the image sensor with respect to an imaginary vertical line, the image being captured when the tilt angle of the tilt angle sensor subsystem is equal to zero degrees, the method including:

a) generating an image depth map associated with the image;
b) generating first position information associated with a first position which corresponds to the first target, and second position information associated with a second position which corresponds to the second target; and
c) computing an estimate of a distance between the first target and the second target based on at least the image depth map, the first position information and the second position information;

wherein computing the estimate of a distance between the first target and the second target further includes:
   c-1) estimating a first target distance between the first target and the lens based on at least the first position information, the image depth map, a focus length of the lens for capturing the image, and a pixel size of the image sensor;
   c-2) computing the estimate of the distance between the first target and the second target, based on at least the first target distance, the first position information, the second position information, and the focus length of the lens, computing the estimate includes estimating a second target distance between the second target and the lens and additionally utilizing the second position information, and computing the estimate of the distance between the first target and the second target additionally utilizing the second target distance;
   c-3) obtaining a first pixel position and a second pixel position on the image sensor based respectively on the first position information and the second position information, the first and second pixel positions corresponding to the first and second positions in the image, respectively;
   c-4) calculating a first distance between the first pixel position and a center point of the image sensor, and a second distance between the second pixel position and the center point of the image sensor; and
   c-5) computing the estimate of the actual distance ($h_2$) between the first target and the second target using the following equations:

$$h_2 = d_1 \cdot \sin(K_1) - d_2 \cdot \sin(K_2)$$

$$K_1 = \tan^{-1} \frac{h_{21}}{f}$$

$$K_2 = \tan^{-1} \frac{h_{22}}{f}$$

where ($d_1$) represents the first target distance, ($d_2$) represents the second target distance, ($h_{21}$) represents the first distance, ($h_{22}$) represents the second distance, and (f) represents the focus length of the lens.

12. The non-transitory computer-readable medium of claim 11, the distance estimation system further including a display, wherein the software application further includes instructions that, when executed by the processor, causes the processor to control the display to display the estimate of the distance on the image.

* * * * *